(12) United States Patent
Suzuki (10) Patent No.: US 7,961,703 B2
(45) Date of Patent: Jun. 14, 2011

(54) SYSTEM AND METHOD FOR MAINTAINING PACKET PROTOCOL CONTEXT

(75) Inventor: Takashi Suzuki, Ichikawa (JP)

(73) Assignee: Research In Motion Limited, Waterloo (CA)

( * ) Notice: Subject to any disclaimer, the term of this patent is extended or adjusted under 35 U.S.C. 154(b) by 524 days.

(21) Appl. No.: 11/565,193

(22) Filed: Nov. 30, 2006

(65) Prior Publication Data

US 2008/0130594 A1    Jun. 5, 2008

(51) Int. Cl.
*H04B 7/212* (2006.01)
*H04W 4/00* (2009.01)
*G06F 15/16* (2006.01)

(52) U.S. Cl. ............. 370/347; 370/338; 709/230

(58) Field of Classification Search .......... 370/347
See application file for complete search history.

(56) References Cited

U.S. PATENT DOCUMENTS

| | | | |
|---|---|---|---|
| 6,505,042 B1 * | 1/2003 | Hafiz | 455/434 |
| 6,981,048 B1 | 12/2005 | Abdolbaghian | |
| 2003/0169704 A1 | 9/2003 | Okanoue | |
| 2004/0033806 A1 * | 2/2004 | Daniel et al. | 455/450 |
| 2005/0188098 A1 * | 8/2005 | Dunk | 709/232 |
| 2006/0020707 A1 | 1/2006 | Undery et al. | |
| 2007/0291778 A1 * | 12/2007 | Huang et al. | 370/410 |
| 2008/0148378 A1 * | 6/2008 | Wing et al. | 726/11 |

FOREIGN PATENT DOCUMENTS

EP    1 569 404 A    8/2005

* cited by examiner

*Primary Examiner* — Lester Kincaid
*Assistant Examiner* — Yu (Andy) Gu
(74) *Attorney, Agent, or Firm* — Hanley, Flight & Zimmerman, LLC.

(57) ABSTRACT

A system and method for maintaining a packet protocol context, such as a PDP (Packet Data Protocol) context, is provided. A mobile device communicates over a packet protocol context. If there has been no data activity over the packet protocol context for a timeout duration, then the network may deactivate the packet protocol context. The mobile device can re-establish the packet protocol context; however, excessively re-establishing the packet protocol context places a burden on the network. According to an embodiment of the application, the mobile device determines the timeout duration, for example by measuring the timeout duration. Upon data inactivity for a time period near the timeout duration, the mobile device transmits a packet over the packet protocol context so as to maintain the packet protocol context. Accordingly, the load on the network can be reduced by achieving a suitable frequency of short data transmission from the mobile device.

19 Claims, 6 Drawing Sheets

SYSTEM AND METHOD FOR MAINTAINING PACKET PROTOCOL CONTEXT

FIELD OF THE APPLICATION

The application relates to wireless communication, and more particularly to packet protocol contexts.

BACKGROUND

In a UMTS (Universal Mobile Telecommunications System) network, a GGSN (Gateway General Packet Radio Service Support Node) typically has an inactivity timer for each established PDP (Packet Data Protocol) context. A mobile device can communicate with the UMTS network over an active PDP context. However, if the inactivity timer expires, the GGSN initiates PDP context deactivation to release the PDP context. The mobile device can re-establish the PDP context; however, excessively re-establishing the PDP context places a burden on the UMTS network.

Existing approaches involve the mobile device periodically transmitting packets over the PDP context so as to maintain the PDP context. However, in certain circumstances, the transmitting is too frequent and results in unnecessary activity. This can cause an overload situation for the network or cause radio resource shortages if many of such mobile devices are concentrated in a small area such as a cell or cell sector.

In order to provide "always-on" experience for end users, some UMTS networks have functionality to preserve the PDP context while releasing the associated radio resource when no data traffic is expected (see 3GPP TS25.060). Since radio resources are not tied to the PDP context when no traffic is expected, a network operator may configure the inactivity timer in the GGSN to have a large value, or may remove the inactivity timer altogether. In such cases, it could be wasteful in terms of UMTS network resources for mobile devices to periodically transmit data at an interval which is much shorter than the inactivity timer.

Regardless of the length of data transmitted by the mobile device, the mobile device and the network exchange many signalling or control messages to establish and release an RRC (Radio Resource Control) connection, a signalling connection, a PDP context and a radio bearer. Moreover, the radio resources (e.g. downlink scrambling code) will remain allocated for a while after the data transmission is completed, e.g. 15 seconds. When a large number of mobile devices are concentrated in single cell, the periodic transmission of short data could impact the radio network and radio resources.

BRIEF DESCRIPTION OF THE DRAWINGS

Embodiments will now be described with reference to the attached drawings in which.

DETAILED DESCRIPTION OF EMBODIMENTS

According to a broad aspect, there is provided a method in a mobile device comprising: determining a timeout duration for which data inactivity over a packet protocol context causes the packet protocol context to become deactivated by a network; and upon data inactivity for a time period near the timeout duration, transmitting a packet over the packet protocol context so as to maintain the packet protocol context; wherein determining the timeout duration comprises measuring the timeout duration by measuring a time interval of inactivity over the packet protocol context up until the packet protocol context becomes deactivated by the network.

According to another broad aspect, there is provided a computer readable medium having computer executable instructions stored thereon for execution on a processor so as to implement the method summarised above.

According to another broad aspect, there is provided a mobile device comprising: a wireless access radio adapted to communicate with a wireless network; and a packet protocol context function adapted to: determine a timeout duration for which data inactivity over a packet protocol context causes the packet protocol context to become deactivated by the network; and upon data inactivity for a time period near the timeout duration, transmit a packet over the packet protocol context so as to maintain the packet protocol context; wherein the packet protocol context function is adapted to determine the timeout duration by measuring a time interval of inactivity over the packet protocol context up until the packet protocol context becomes deactivated by the network.

Communication System

Figure 1A:
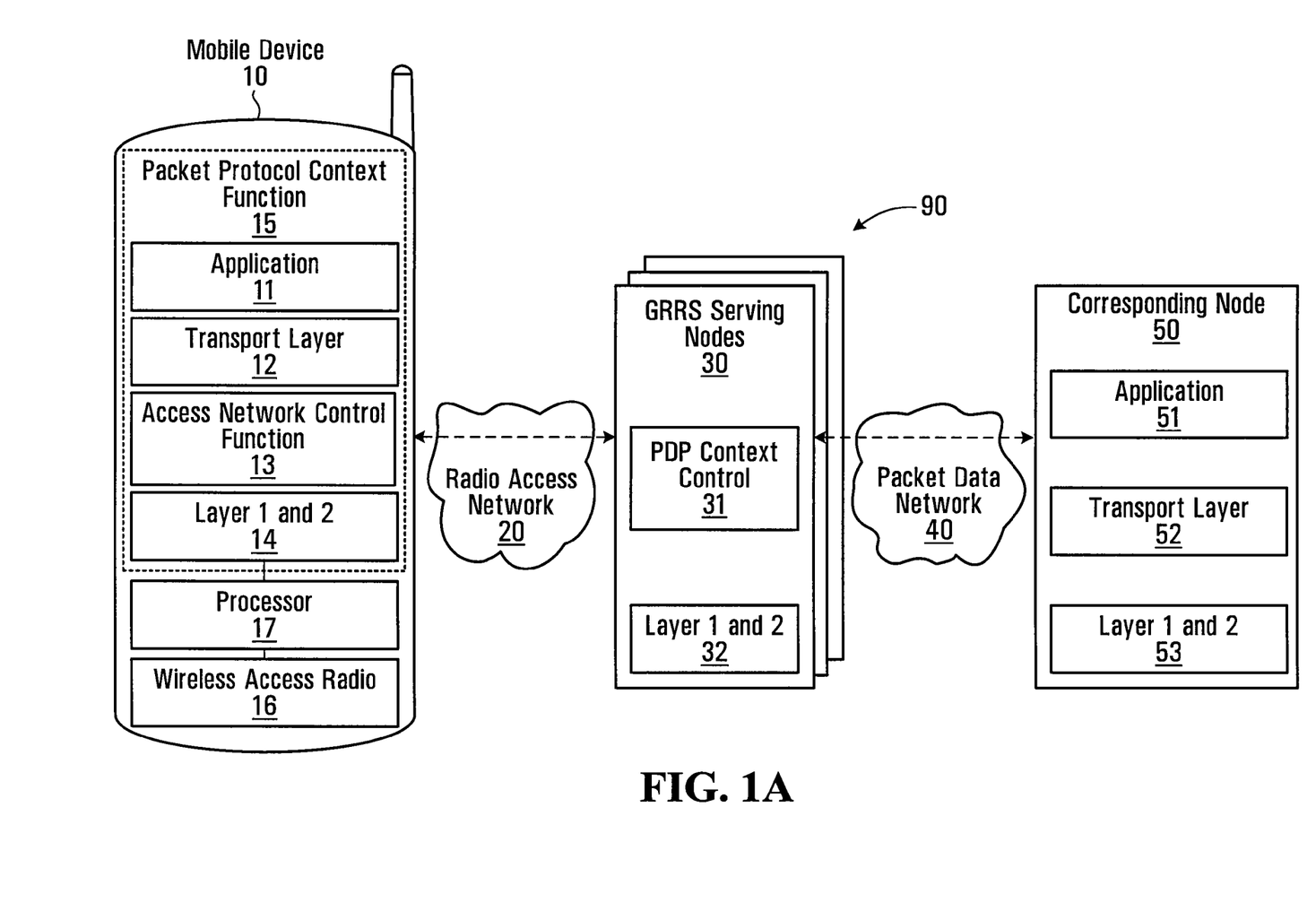
FIG. 1A is a block diagram of an example communication system.

Referring now to FIG. 1, shown is a block diagram of an example communication system 90. The communication system has a mobile device 10, a radio access network 20, GPRS (General Packet Radio Service) serving nodes 30, a packet data network 40, and a corresponding node 50. The communication system 90 may have other components, but they are not shown for sake of simplicity. The mobile device 10 has a wireless access radio 16, a processor 17, and a packet protocol context function 15. The packet protocol context function 15 has an application 11, a transport layer 12, an access network control function 13, and a layer one and two 14. The GPRS serving nodes 30 may for example include SGSN (Serving GPRS Support Node) and/or GGSN (Gateway GPRS Support Node) nodes. The GPRS serving nodes 30 have a PDP context control 31, and a layer one and two 32. The corresponding node 50 has an application 51, a transport layer 52, and a layer one and two 53.

In operation, the mobile device 10 communicates with the corresponding node 50 through the radio access network 20, the GPRS serving nodes 30, and the packet data network 40. The mobile device 10 communicates with the radio access network 20 using its wireless access radio 16. Such communication may for example involve the application 11 or the transport layer 12 of the mobile device 10 communicating with the application 51 or the transport layer 52, respectively, of the corresponding node 50. The application 11 of the mobile device 10 may be any application that communicates over the network, for example a web browser. The application 51 of the corresponding node 50 may be any corresponding application, such as an HTTP (hypertext transfer protocol) server. In some implementations, the communications are in accordance with the IP (Internet Protocol).

Such communication is transmitted over a PDP context between the mobile device 10 and the GPRS serving nodes 30. A PDP context as a logical notation can be thought as being a pipe between the mobile device 10 and the GGSN of the GPRS serving nodes 30. The pipe is used for IP packet transport. When the PDP context is created for IP transport, the mobile device 10 is given an IP address. If there has been no data activity over the PDP context for a timeout duration, then the GPRS serving nodes 30 initiates PDP context deactivation to release the PDP context. The mobile device 10 can reestablish the PDP context; however, excessively re-establishing the PDP context places a burden on the network. According to an embodiment of the application, the packet protocol context function 15 implements a method in the mobile device 10 to determine the timeout duration. Upon data inactivity for a time period near the timeout duration, the packet protocol context function 15 transmits a packet over the PDP context so as to maintain the PDP context. In this manner, the load on the network can be reduced by achieving a suitable frequency of short data transmission from the mobile device 10. Further details are provided below with reference to FIGS. 2 to 6.

The access network control function 13 of the mobile device 10 controls access to the radio access network 20 and the GPRS serving nodes 30. For example, the access network control function 13 activates, maintains and deactivates PDP contexts. When the PDP context is deactivated, the access network control function 13 informs the transport layer 12 with a cause value and if the deactivation is performed locally or by signalling. The CR 344 revision 4 to 3GPP Technical Specification 24.008 explains the case where deactivation is performed locally. The transport layer 12 periodically sends short data in order to maintain the PDP context.

The radio access network 20 provides radio communication for the mobile device 10 and for any other mobile devices that may be present (not shown). The radio access network 20 may trigger preservation of PDP context and releases only radio resources associated with the PDP context while maintaining the PDP context information. The GPRS serving nodes 30 perform mobility management and session management to provide wireless data connection. In some implementations, a GGSN implements an inactivity timer for each PDP context established. The GGSN may release the PDP context by sending PDP context deactivation message to the mobile device 10 on expiry of the inactivity timer.

While the illustrated example focuses on implementations as applicable to a GPRS network, more generally, embodiments of the applications are applicable to any network that deactivates a packet protocol context upon a timeout duration of data inactivity. Embodiments of the application may for example be applicable to a CDMA2000 system. Implementations may vary depending on the network.

It is to be understood that the communications system 90 is very specific for example purposes only. The mobile device 10, the GPRS serving nodes 30, and the corresponding node 50 are each shown with a very specific arrangement of components. Other arrangements of components are possible. For example, in other implementations, the application 11 and the transport layer 12 of the packet protocol context function 15 are combined into a single component. In other implementations, appropriate functions that may or may not be layers implement the transport layer 12 and the layer one and two 14. The packet protocol context function 15 is shown with a very specific combination of components. Other combinations are possible. In other implementations, the application 11 is separate from the packet protocol context function 15. Other arrangements of components are possible.

In the illustrated example, the packet protocol context function 15 is implemented as software and is executed on the processor 17. However, more generally, the packet protocol context function 15 may be implemented as software, hardware, firmware, or any appropriate combination thereof.

Figure 1B:
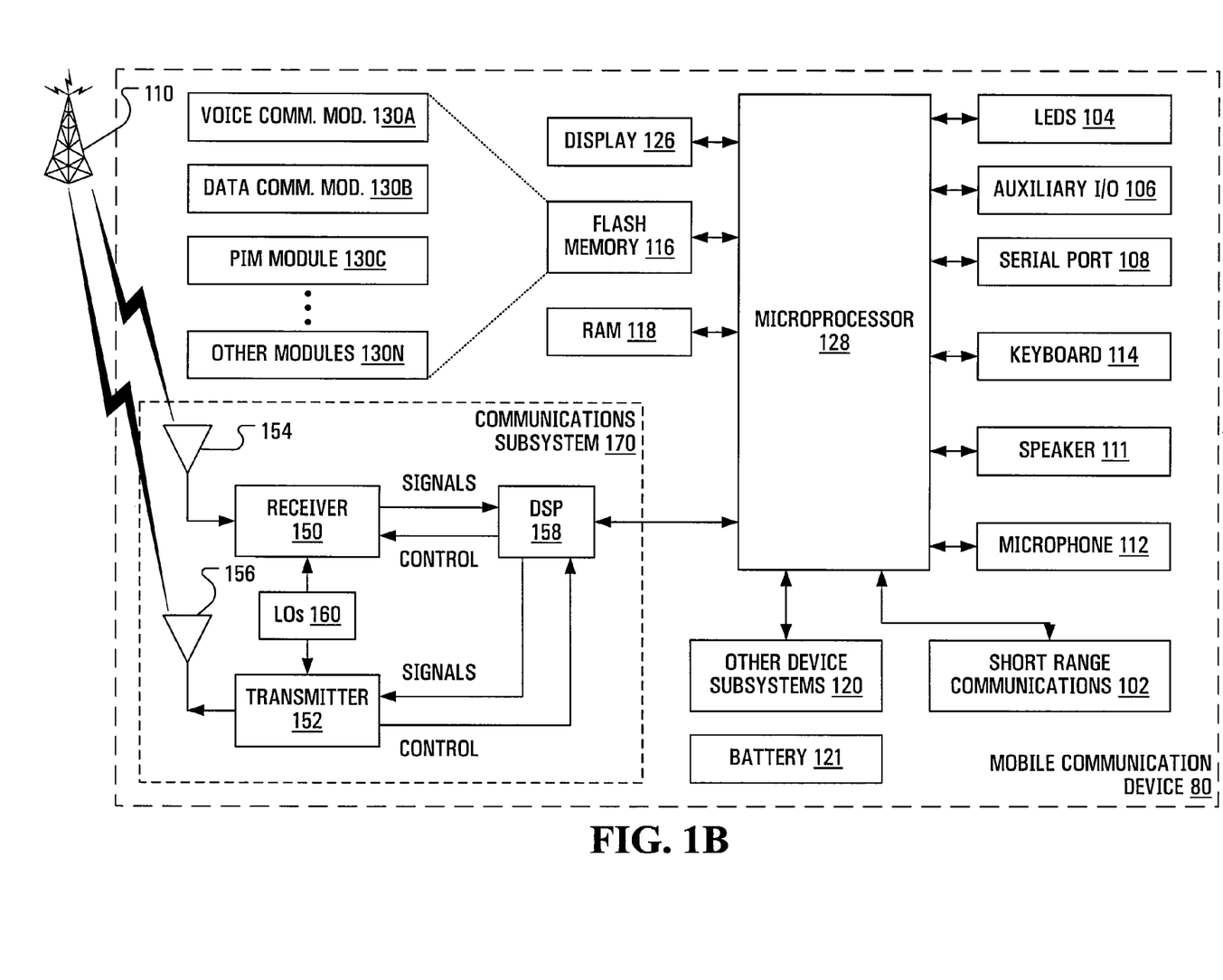
FIG. 1B is a block diagram of a mobile device.

Referring now to FIG. 1B, shown is a block diagram of another mobile device 80 that may implement any of the methods described herein. The mobile device 80 is shown with specific components for implementing features similar to those of the mobile device 10 of FIG. 1A. It is to be understood that the mobile device 80 is shown with very specific details for example purposes only.

A processing device (a microprocessor 128) is shown schematically as coupled between a keyboard 114 and a display 126. The microprocessor 128 is a type of processor with features similar to those of the processor 17 of the mobile device 10 shown in FIG. 1A. The microprocessor 128 controls operation of the display 126, as well as overall operation of the mobile device 80, in response to actuation of keys on the keyboard 114 by a user.

The mobile device 80 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 80 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 80 may have a battery 121 to power the active elements of the mobile device 80. The mobile device 80 is in some embodiments a two-way radio frequency (RF) communication device having voice and data communication capabilities. In addition, the mobile device 80 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 80 may also be stored to the RAM 118.

The microprocessor 128, in addition to its operating system functions, enables execution of software applications on the mobile device 80. A predetermined set of software applications that control basic device operations, such as a voice communications module 130A and a data communications module 130B, may be installed on the mobile device 80 during manufacture. In addition, a personal information manager (PIM) application module 130C may also be installed on the mobile device 80 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A,130B,130C,130N of the flash memory 116 can be configured for implementing features similar to those of the packet protocol context function 15 of the mobile device 10 shown in FIG. 1A. For example, one of the other modules 130N can be configured so that when it is executed on the microprocessor 128 the mobile device 80 determines the timeout duration and upon data inactivity of a PDP context for a time period near the timeout duration the mobile device 80 transmits a packet over the PDP context so as to maintain the PDP context.

Communication functions, including data and voice communications, are performed through the communication subsystem 170, and possibly through the short-range communications subsystem 170. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 16 of the mobile device 10 shown in FIG. 1A. The specific design and implementation of the communication subsystem 170 is dependent upon the communication network in which the mobile device 80 is intended to operate. For example, the communication subsystem 170 of the mobile device 80 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 80.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 80 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 80. In addition, the display 126 may also be utilized in voice communication mode, for example, to display the identity of a calling party, the duration of a voice call, or other voice call related information.

The short-range communications subsystem 102 enables communication between the mobile device 80 and other proximate systems or devices, which need not necessarily be similar devices. For example, the short-range communications subsystem may include an infrared device and associated circuits and components, or a Bluetooth™ communication module to provide for communication with similarly-enabled systems and devices.

Method in a Mobile Device

Figure 2:
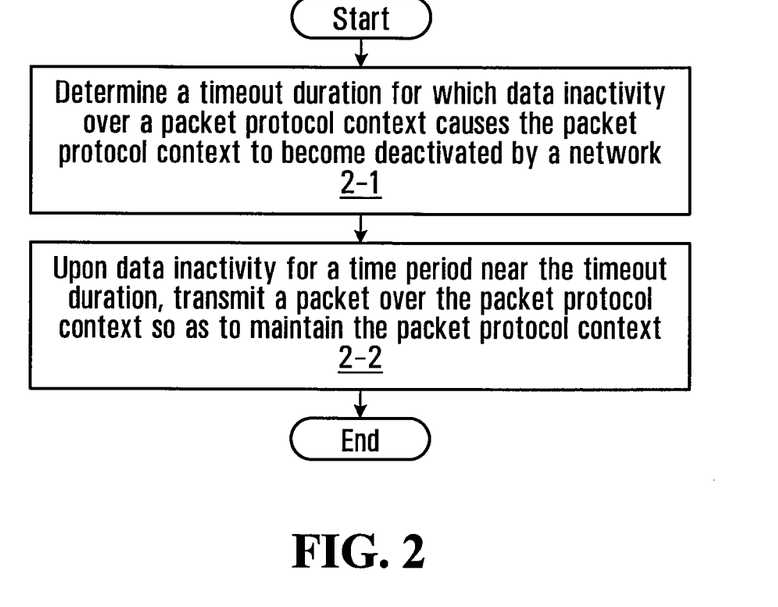
FIG. 2 is a flowchart of an example method of maintaining a packet protocol context by transmitting packets.

Referring now to FIG. 2, shown is a flowchart of an example method of maintaining a packet protocol context by transmitting packets. This method may be implemented in a mobile device, for example by the packet protocol context function 15 of the mobile device 10 shown in FIG. 1.

At step 2-1, the mobile device determines a timeout duration for which data inactivity over a packet protocol context causes the packet protocol context to become deactivated by a network. At step 2-2, upon data inactivity for a time period near the timeout duration, the mobile device transmits a packet over the packet protocol context so as to maintain the packet protocol context.

In some instances, there are a plurality of packet protocol contexts for a mobile device. In some implementations, the method described above is applicable to each packet protocol context. Accordingly, in some implementations, the mobile device determines the timeout duration for each packet protocol context. In other implementations, the mobile device determines the timeout duration for only one of the packet protocol contexts and assumes that the timeout duration for the other packet protocol contexts is the same. Other implementations are possible. Furthermore, in some implementations, for each packet protocol context for which there is data inactivity for the time period near the timeout duration, the mobile device transmits a packet over the packet protocol context so as to maintain the packet protocol context. Other implementations are possible.

There are many possibilities for the packet protocol context. The packet protocol context typically depends on the type of network in which the mobile device resides. In some implementations, the mobile device resides in a UMTS network and the packet protocol context is a PDP context. Other implementations are possible. More generally, the packet protocol context is any IP context.

The mobile device transmits the packet near the time that the packet protocol context is expected to be deactivated should there be no data activity over the packet protocol context. It is to be understood that the exact time that the mobile device transmits the packet is implementation specific. In some implementations, the packet is transmitted when a predefined proportion of the timeout duration has passed since the last data activity. The predefined proportion may for example be 90% or 95%. Alternatively, the predefined proportion may be 85%. Alternatively, the predefined proportion may be any appropriate proportion between 80% and 99%. Alternatively, the predefined proportion is the largest possible value such that the packet can be transmitted and still cause the network to maintain the packet protocol context due to the data activity caused by the packet being transmitted. In other implementations, the packet is transmitted when there has been data inactivity for a predefined time margin less than the timeout duration. The predefined time margin is implementation specific and may for example be set to 2 or 3 times a round trip time (RTT) of a short packet between the mobile device and the corresponding node if RTT measurements are available. Alternatively, the predefined time margin is set to 4 or 5 times the RTT. Alternatively, the predefined time margin is set to any appropriate time between 2 and 5 times the RTT. The predefined time margin need not be an integer multiple of the RTT. Alternatively, the predefined time margin is the smallest possible value such that the packet can be transmitted and still cause the network to maintain the packet protocol context due to the data activity caused by the packet being transmitted. Other implementations are possible.

There are many ways for the mobile device to determine the round trip time of a short packet between the mobile device and a corresponding node of the network. In some implementations, the mobile device measures the round trip time. Once measured, the mobile device can determine the predefined margin based on the round trip time that has been measured. In some implementations, the mobile device measures the round trip time more than once and determines the predefined margin based on each measurement. In specific implementations, the mobile device determines the predefined margin as an arithmetic average of the measurements. However, more generally, any appropriate mathematical or logical function may be implemented for determining the predefined margin based on multiple measurements. In some implementations, the mobile device measures the round trip time dynamically so that changes to the round trip time are reflected by subsequent measurements. The round trip time might change for example if the mobile device moves to another network. In other implementations, the round trip time is communicated to the mobile device. Other implementations are possible.

There are many possibilities for transmitting the packet over the packet protocol context. In some implementations, the mobile device transmits a short burst. Other implementations are possible. More generally, the mobile device may transmit any packet.

There are many ways that the mobile device may determine the timeout duration for which data inactivity over the packet protocol context causes the packet protocol context to become deactivated by the network. In some implementations, the mobile device measures the timeout duration. In other implementations, the mobile device receives a message indicating the timeout duration.

There are many ways for the mobile device to receive a message indicating the timeout duration. In some implementations, the network signals an inactivity timer to the mobile device when a PDP context is established. In specific implementations, an Activate PDP context accept message is extended to have a new information element indicating the inactivity timer. In other implementations, any message indicating the timeout duration is communicated to the mobile device. Other implementations are possible.

There are many ways that the mobile device may measure the timeout duration. In some implementations, the mobile device measures a time interval of inactivity over the packet protocol context up until the packet protocol context becomes deactivated by the network. In some implementations, the mobile device measures the timeout duration only once, as it is assumed that the timeout duration is static. In other implementations, the mobile device measures the timeout duration dynamically. Dynamically measuring the timeout duration involves measuring the timeout duration on some sort of ongoing basis such that changes to the timeout duration may be reflected in a subsequent measurement by the mobile device. The timeout duration may change, for example if a network operator changes it. Also, the timeout duration may be different for different networks. Accordingly, if the mobile device is handed off to another network, then the new timeout duration may be different.

In some implementations, the mobile device implements a timer to measure the timeout duration. There are many ways that this can be accomplished. An example method is provided below with reference to FIGS. 3 through 6. It is to be understood that the method described below with reference to FIGS. 3 through 6 is very specific for example purposes only. Other implementations with or without using a timer are possible.

Another Method in a Mobile Device

Referring now to FIGS. 3 through 6, shown are flowcharts of an example method of measuring the timeout duration and transmitting packets according to the timeout duration. This method may be implemented in a mobile device, for example by the packet protocol context function 15 of the mobile device 10 shown in FIG. 1.

By way of overview, the method implements a timer Tm, which counts up, to measure the timeout duration. Once the timeout duration has been measured, the timer Tm is restarted. The timer Tm is also restarted as a function of data activity. Restarting the timer Tm is equivalent to resetting and starting the timer Tm. If the timer increments up to a predefined margin less than the timeout duration, then the mobile device transmits a packet over the PDP context so as to maintain the PDP context. Further details are provided below.

Figure 3:
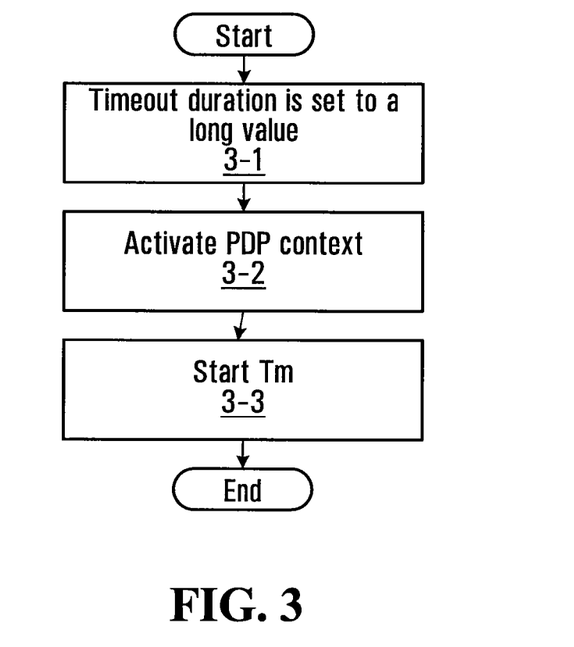
FIGS. 3 through 7 are flowcharts of another example method of maintaining a packet protocol context by transmitting packets.

Referring first to FIG. 3, at step 3-1 the mobile device initialises the timeout duration to a predefined long value, for example 2 hours. The mobile device initialises the timeout duration before the timeout duration can be measured. Initialising the timeout duration may be done for example when the mobile device is initialised. Once the timeout duration has been initialised, the mobile device activates a PDP context at step 3-2. At step 3-3, the mobile device starts the timer Tm.

Figure 4:
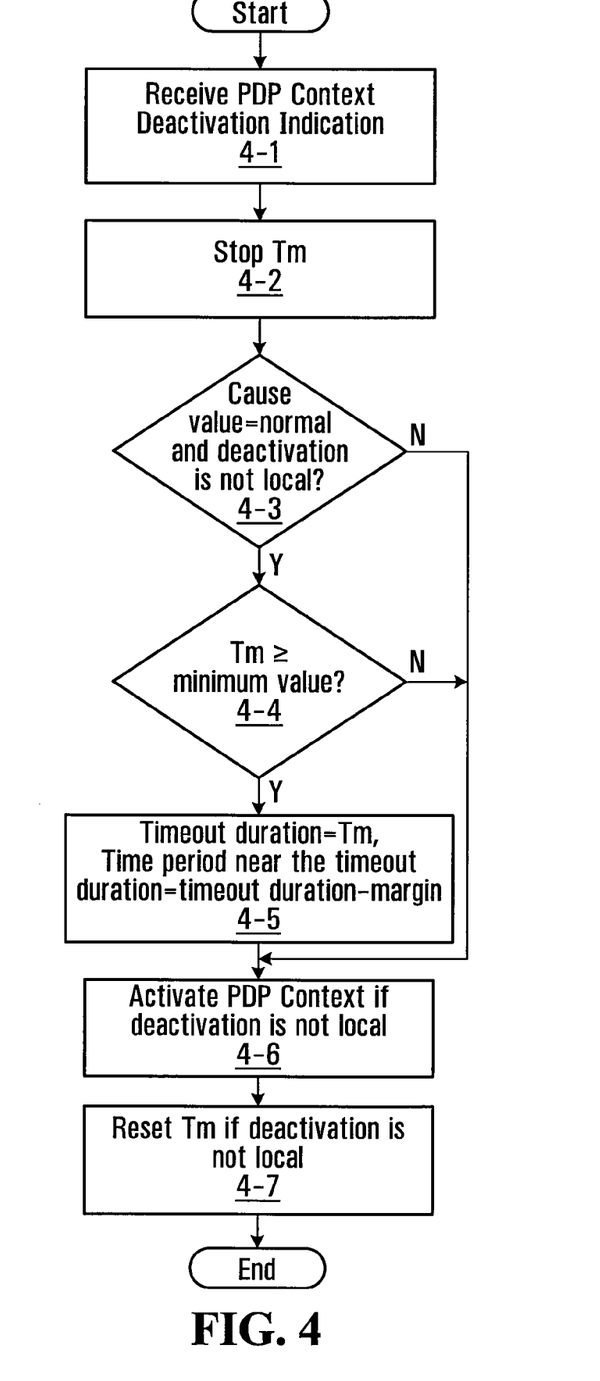

Referring now to FIG. 4, if the mobile device receives a PDP context deactivation indication at step 4-1, then the mobile device stops the timer Tm at step 4-2. At steps 4-3 and 4-4, the mobile device checks to see if two conditions are met. This is done so that the mobile device does not measure an erroneous value for the timeout duration. At step 4-3 the mobile device checks if the cause is normal and the release is not done locally by the mobile device. This is because a locally initiated context deactivation does not reflect the timeout duration and should therefore be ignored. The mobile device determines whether the GPRS serving nodes initiated the PDP context deactivation and that the deactivation was prompted normally. At step 4-4, the mobile device determines if the timer Tm is larger than a pre-defined minimum value. The mobile device checks to see if the timer Tm is larger than a pre-defined minimum value so as to look out for any unexpected signalling sequence performed by the network. If the conditions at steps 4-3 and 4-4 are both satisfied, then at step 4-5 the mobile device determines the timeout duration to be equal to the value indicated by the timer Tm. The time period near the timeout duration is equal to the timeout duration minus a pre-defined margin. Example values for the pre-defined margin have been provided already and are therefore not repeated here. If the two conditions at steps 4-3 and 4-4 are not satisfied, then the value indicated by the timer Tm is not considered, as the measurement is considered to be erroneous. Regardless of whether the timeout duration is determined at step 4-5, the mobile device reactivates the PDP context at step 4-6 if the deactivation is not local and restarts the timer Tm at step 4-7 if the deactivation is not local. The PDP context is not reactivated in the event that the mobile device initiated the PDP context to be deactivated.

There may be many reasons why the measurement is erroneous. In some implementations, the mobile device may have a plurality of PDP contexts. Under normal conditions, the number of PDP contexts that the mobile device is aware of is equal to the number of PDP contexts that the network is aware of for the mobile device. In other words, the mobile device and the network are in synch with one another in regards to PDP contexts. However, in some instances, the number of PDP contexts that the mobile device is aware of is different than the number of PDP contexts that the network is aware of for the mobile device. The behaviour under such a situation can be unpredictable and the mobile device can receive a PDP context deactivation indication from the network at an earlier or a later time than it would under normal conditions.

Figure 5:
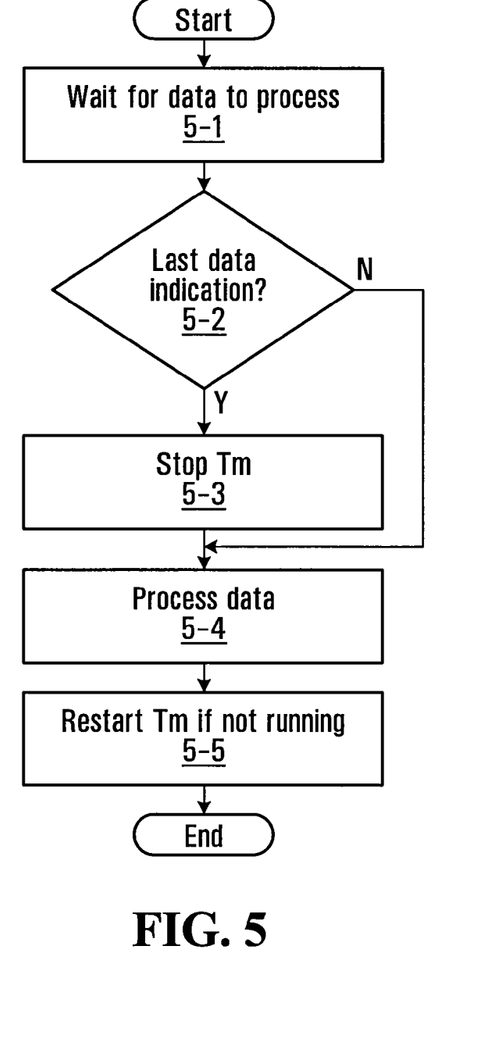

Referring now to FIG. 5, handling of the timer Tm during data transmission is described. If at step 5-1 an application of the mobile device requests the transport layer to transmit data, or the IP protocol indicates to the transport layer that there is data to receive for the PDP context, then the transport layer checks to see if there is an indication that more data is expected at step 5-2. Both data transmission and reception are considered and it is assumed that the transport layer can tell if the received transmission is the last one or not. If no more data is expected, then the transport layer stops the timer Tm at step 5-3. The transport layer processes the data at step 5-4 and passes it to lower layer for transmission or to the higher layer for the reception. The data is transferred not only to the lower layer (uplink transmission) but also to the upper layer (the device receiving data). The transport layer then restarts the timer Tm at step 5-5 if it is not running.

Figure 6:
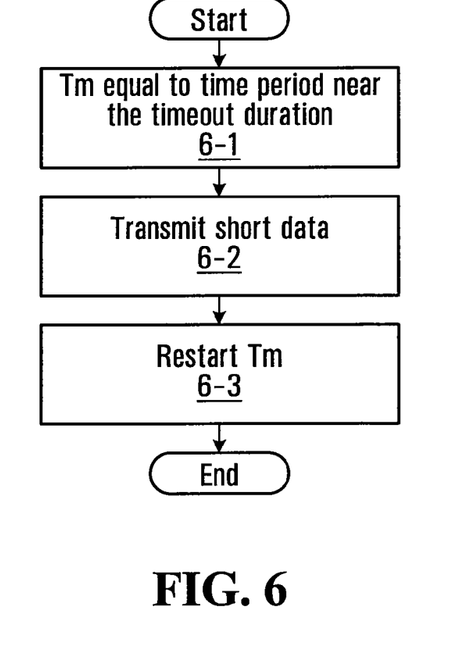

If there is no data activity for the time period near the timeout duration, then the timer Tm will indicate that this is the case. Referring now to FIG. 6, if the timer Tm is equal to the time period near the timeout duration at step 6-1, then the transport layer transmits short data at step 6-2 in order to maintain the PDP context. At step 6-3 the transport layer restarts the timer Tm.

Figure 7:
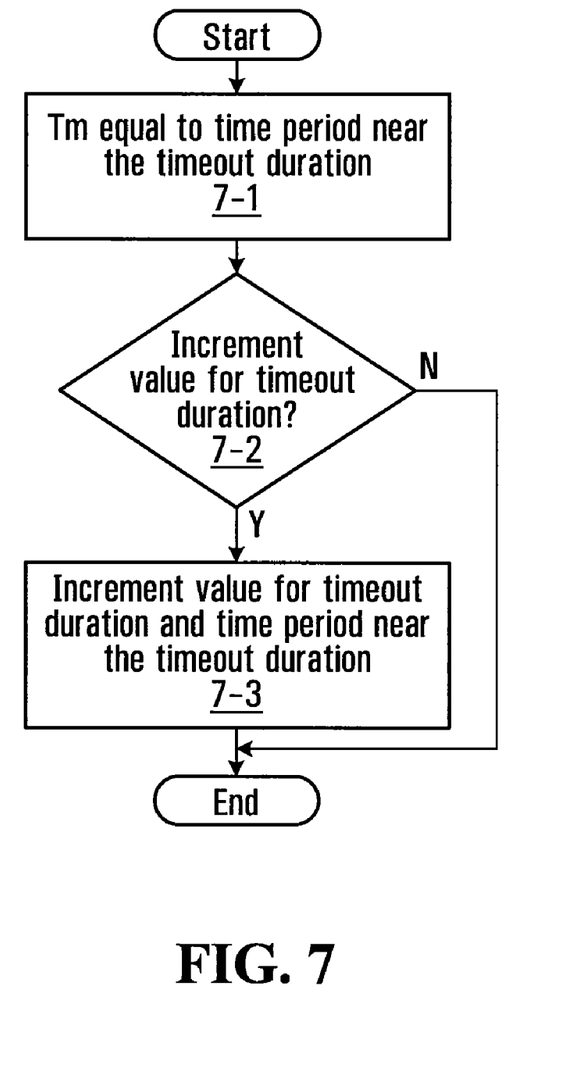

There may be instances when the value for timeout duration is initialized with a long value that is shorter than the actual timeout duration. For example, the mobile device might assume that the timeout period is two hours when the actual timeout period is 24 hours. This could result in the mobile device transmitting short data at a more frequent basis than the lowest frequency of transmission that would maintain the PDP context. Accordingly, in some implementations, the mobile device increments the value for the timeout duration. An example of how this may be implemented is provided with reference to FIG. 7. At step 7-1, if the timer Tm is equal to the time period near the timeout duration, then at step 7-2 the mobile device determines whether the value of the timeout duration should be incremented. If the mobile device determines that the value for the timeout duration should be incremented, then at step 7-3 the mobile device increments the value for the timeout duration. The value for the time period near the timeout duration is also incremented accordingly.

There are many ways that the mobile device can determine whether the value for the timeout duration should be incremented. In some implementations, the mobile device makes this determination based on whether the timeout duration has been successfully measured. In some implementations, the mobile device increments the value for the timeout duration only if the mobile device has yet to measure the timeout duration. Other implementations are possible.

There are many possibilities for incrementing the value for the timeout duration. In some implementations, this depends on the initial value of the timeout duration. In some implementations, the initial value is two hours and the increment is one hour. Other implementations are possible.

In some implementations, the steps described above with reference to FIGS. 4 through 7 are repeated on an ongoing basis. This allows the mobile device to dynamically measure the timeout duration on an ongoing basis. Accordingly, if the timeout duration should change, then the mobile device can acquire the new timeout duration. In other implementations, once the timeout duration has been measured, the mobile device assumes that the timeout duration is static and does not measure the timeout duration again. Other implementations are possible.

Numerous modifications and variations of the present application are possible in light of the above teachings. It is therefore to be understood that within the scope of the appended claims, the application may be practised otherwise than as specifically described herein.

I claim:

1. A method for execution by a mobile device, the method comprising:
    measuring a timeout duration for which data inactivity over a packet protocol context causes the packet protocol context to become deactivated by a network, wherein measuring the timeout duration comprises:
        (a) using a timer to time inactivity over the packet protocol context:
        (b) upon the packet protocol context being deactivated:
            (i) if deactivation was not locally initiated:
                measuring the timeout duration based on a value of the timer; and
                re-activating the packet protocol context; and
            (ii) if deactivation was locally initiated, ignoring the value of the timer; and
    after the timeout duration has been measured, if the packet protocol context is active yet there has been data inactivity for a time period less than but near the timeout duration, transmitting over the packet protocol context a keep-alive packet for maintaining the packet protocol context.

2. The method of claim 1 further comprising:
    assuming a default value for the timeout duration before measuring the timeout duration.

3. The method of claim 1 wherein measuring the timeout duration further comprises dynamically measuring the timeout duration.

4. The method of claim 1 wherein measuring the timeout duration further comprises:
    starting the timer upon activating the packet protocol context; and
    restarting the timer as a function of data traffic over the packet protocol context;

wherein measuring the timeout duration based on the value of the timer only if deactivation was not locally initiated comprises:
  measuring the timeout duration based on the value of the timer only if a context deactivation indication was received and indicates that the packet protocol. context was explicitly deactivated by the network.

5. The method of claim 4 wherein measuring the timeout duration further:
  measuring the timeout duration based on the value of the timer only if the value of the timer indicates a time period greater than a predefined minimum value.

6. The method of claim 4 further comprising:
  determining the time period less than but near the timeout duration to be equal to the timeout duration minus a predefined margin.

7. The method of claim 6 wherein the predefined margin is between two and three times a round trip time of a short packet between the mobile device and a corresponding node of the network.

8. The method of claim 6 further comprising:
  measuring a round trip time of a short packet between the mobile device and a corresponding node of the network; and
  determining the predefined margin based on the round trip time that has been measured.

9. The method of claim 4 wherein restarting the timer upon data traffic over the packet protocol context comprises:
  stopping the timer if further data traffic is expected;
  upon processing the further data traffic, restarting the timer if it is not running.

10. The method of claim 4 further comprising:
  restarting the timer after measuring the timeout duration.

11. The method of claim 4 comprising:
  transmitting over the packet protocol context the keep-alive packet for maintaining the packet protocol context upon the timer indicating the time period less than but near the timeout duration.

12. The method of claim 4 further comprising:
  determining whether to increment the timeout duration; and
  incrementing the timeout duration if it has been determined to increment the timeout duration.

13. The method of claim 1 further comprising:
  upon re-activating the packet protocol context, re-setting the timer: and
  using the timer for determining whether there is data inactivity for the time period less than but near the timeout duration.

14. The method of claim 13 wherein using the timer comprises:
  starting the timer upon activating the packet protocol context; and
  restarting the timer upon any data traffic over the packet protocol context;
  wherein the method comprises transmitting over the packet protocol context the keep-alive packet for maintaining the packet protocol context upon the timer indicating the time period less than but near the timeout duration.

15. The method of claim 1 wherein transmitting over the packet protocol context the keep-alive packet for maintaining the packet protocol context comprises transmitting a short burst.

16. The method of claim 1 wherein the packet protocol context is a PDP (Packet Data Protocol) packet protocol context.

17. A non-transitory computer readable medium having computer executable instructions stored thereon for execution on a processor so as to implement the method of claim 1.

18. A mobile device comprising:
  a wireless access radio configured to communicate with a wireless network; and
  a packet protocol context function configured to:
  measure a timeout duration for which data inactivity over a packet protocol context causes the packet protocol context to become deactivated by the network, wherein the packet protocol context function is configured to measure the timeout duration by:
    (a) using a timer to time inactivity over the packet protocol context:
    (b) upon the packet protocol context being deactivated:
      (i) if deactivation was not locally initiated:
        measuring the timeout duration based on a value of the timer; and
        re-activating the packet protocol context; and
      (ii) if deactivation was locally initiated, ignoring the value of the timer; and
  after the timeout duration has been measured, if the packet protocol context is active yet there has been data inactivity for a time period less than but near the timeout duration, transmit over the packet protocol context a keep-alive packet for maintaining the packet protocol context.

19. The mobile device of claim 18 wherein the packet protocol context function comprises:
  a transport function for communicating over the wireless access radio; and
  an access network control function for controlling transmission of packets.

* * * * *

UNITED STATES PATENT AND TRADEMARK OFFICE
CERTIFICATE OF CORRECTION

PATENT NO.         : 7,961,703 B2
APPLICATION NO.    : 11/565193
DATED              : June 14, 2011
INVENTOR(S)        : Takashi Suzuki It is certified that error appears in the above-identified patent and that said Letters Patent is hereby corrected as shown below:

Column 11, line 6 (claim 4): after "protocol" delete "."
    Column 11, line 9 (claim 5): after "further" insert --comprises--
    Column 11, line 45 (claim 13): after "timer" replace ":" with --;--
    Column 12, line 29 (claim 18): after "context" replace ":" with --;--

Signed and Sealed this
Fifteenth Day of November, 2011

David J. Kappos
*Director of the United States Patent and Trademark Office*